United States Patent Office 3,365,573
Patented Jan. 23, 1968

3,365,573
METHOD OF SEPARATING OF SILICON ISOTOPES USING SILICON DISULFIDE AS THE FEED MATERIAL
William C. Davis, Clifford W. Sheridan, and Joe G. Tracy, Oak Ridge, Tenn., assignors to the United States of America as represented by the United States Atomic Energy Commission
No Drawing. Filed Jan. 12, 1965, Ser. No. 425,090
3 Claims. (Cl. 250—41.9)

ABSTRACT OF THE DISCLOSURE

An electromagnetic method of separating silicon isotopes wherein silicon disulfide is used as the feed material.

---

Our invention relates to electromagnetic methods of separating isotopes, and more particularly to the separation of the isotopes of silicon.

The natural abundance of silicon isotopes is: $^{28}$Si—92.27 percent; $^{29}$Si—4.68 percent; and $^{30}$Si—3.05 percent. The separated isotopes of silicon are used in many nuclear studies. For example, they are used in the determination of energy levels, particle reactions neutron capture cross sections, nuclear reactions forming new nuclei, nuclear spins, and gamma ray resonances. In addition, substantially pure (>95%) $^{29}$Si and $^{30}$Si are desired for use in instruments for measuring neutron energies. One such instrument is described in U.S. Patent No. 3,129,329, issued Apr. 14, 1964, to T. A. Love and R. B. Murray.

Silicon isotopes have been successfully separated in the electromagnetic mass spectrometer, known as the calutron, described in U.S. Patent No. 2,709,222, issued to E. O. Lawrence. In the calutron a feed material is vaporized; the vapor is bombarded with electrons to ionize the feed material; the ions are accelerated through a magnetic field whereby ions having different masses pass along different paths; and the ions having different masses are separately collected. In this process of separating silicon isotopes, silicon tetrachloride has been used for many years as the feed material. This process has been inefficient in having a relatively low rate of ion collection. In addition, the collected isotopes have been partially contaminated with neutral material resulting in a lower than desired purity.

It is accordingly one object of our invention to provide an improved method of separating silicon isotopes.

It is another object to provide a method of separating silicon isotopes wherein substantially pure istotopes are obtained.

It is also an object to provide a method of separating silicon isotopes whereby increased quantities of the separated isotopes are collected in a given period of time.

In accordance with our invention, we have provided, in an electromagnetic method of separating isotopes comprising the steps of ionizing a vapor from a mass of a silicon compound containing said isotopes, accelerating the resulting ions through a magnetic field whereby ions having different masses pass along different paths, and separately collecting the ions, the improvement comprising providing said silicon compound in the form of silicon disulfide.

This method of separating silicon isotopes is unexpectedly superior to prior art methods. The quantity of silicon isotopes separated in a calutron per unit time can be doubled and the purity of the product increased with no change in process parameters other than those necessarily changed as a result of changing the feed. Our method will result in the collection of isotopes of desired purity and in a cost savings during the collection of 100 grams each of $^{30}$Si and $^{29}$Si of about one million dollars. In view of the small differences between the masses of isotopes of sulfur and silicon, isotopes of sulfur can be separated concurrently with separation of silicon isotopes.

Sulfides of other elements had previously been used in a calutron, but were not considered attractive as a feed material because the sulfur reacted with equipment surfaces, corroding them, and they offered no compensating advantages in quantity of isotopes separated and purity of the product. For instance, the sulfides of iron, mercury, nickel, molybdenum and lead have been used as feed materials in the calutron; however little difference was found in either the current density or the product purity between the sulfide and the chloride of these elements. It is not known why the sulfide of silicon is so superior to the chloride as a feed material for the calutron. Although the superiority appears to result from factors of more ready formation of ions and lower loss of ions as they pass to the collecting zone, the reasons for these factors are unknown.

The following examples are offered to illustrate our invention in more detail. Example I describes our improved process and Example II describes the prior art method of separating silicon isotopes using silicon tetrachloride as a feed.

Example I

A mass of about 150 grams of $SiS_2$ was placed in the heated oven of a calutron ion source and heated to about 500° C. under a pressure of about $1\times10^{-5}$ millimeters of mercury as measured external to the source. The resulting vapor was passed into a conventional ionization compartment where it was ionized by bombarding with 3–3.5 amperes of electrons at a potential of 70–120 volts. These electrons were emitted from a tantalum element heated to about 2100° C. The resulting silicon ions passed through a 3/16" x 5" exit slit in the ionization compartment and were accelerated through a potential of about 60 kilovolts, decelerated to a potential of about 38 kilovolts and then passed through an arc of 180° in free flight to the collector. About 0.8 of a gram of $SiS_2$ per hour was vaporized, and the silicon isotopes were collected at the rate of 10 grams per month for $^{30}$Si and 16 grams per month for $^{29}$Si. The total ion current averaged 59.9 milliamperes and the purity of the isotopes was 97.3 percent for $^{29}$Si and 97.7 percent for $^{30}$Si.

Example II

The system of Example I was used to separate silicon isotopes using $SiCl_4$ as a feed. The only differences in operation were those necessitated by the difference in the feed material. The feed material was maintained at about room temperature and fed from outside the calutron. The pressure within the system was about 3–5 times that of the system of Example I because of the characteristics of this charge material. The total ion current averaged about 29.2 milliamperes and the purity of the product was 63.6 percent for $^{29}$Si and 49.6 percent for $^{30}$Si. These results, together with the results of Example I, are tabulated below.

TABLE

| | Feed Material | Av. Total Ion Current, ma. | Isotopes Collected | Isotopic Purity, Percent |
|---|---|---|---|---|
| Example I | SiS$_2$ | 59.9 | $^{29}$Si<br>$^{30}$Si | 97.3<br>97.7 |
| Example II | SiCl$_4$ | 29.2 | $^{29}$Si<br>$^{30}$Si | 63.6<br>49.6 |

As can be seen from the foregoing table, the ion output using silicon disulfide is approximately double that of silicon tetrachloride and the purity is greatly increased. It has not been possible to obtain silicon isotopes of this purity by any other process.

It is obvious that our invention is applicable to any electromagnetic method of separating silicon isotopes and should be limited only in accordance with the following claims.

What is claimed is:

1. In an electromagnetic method of separating isotopes comprising the steps of ionizing a vapor from a mass of a compound containing a mixture of said isotopes, accelerating the resulting ions through a magnetic field whereby ions having different masses pass along different paths, and separately collecting the ions, the improvement wherein said compound is silicon disulfide.

2. The method of claim 1 wherein isotopes of both silicon and sulfur are collected.

3. In an electromagnetic method of separating silicon isotopes comprising the steps of ionizing a vapor from a mass of a silicon compound containing a mixture of said isotopes, accelerating the resulting ions through a magnetic field whereby ions having different masses pass along different paths, and separately collecting the ions, the improvement wherein said silicon compound is silicon disulfide.

References Cited

"Enriching Stable Isotopes Electromagnetically," by C. P. Keim, from Journal of Applied Physics, vol. 24, No. 10, October 1953, pp. 1255 to 1261.

WILLIAM F. LINDQUIST, *Primary Examiner.*

RALPH G. NILSON, *Examiner.*